United States Patent
Fang et al.

(10) Patent No.: US 12,436,992 B2
(45) Date of Patent: Oct. 7, 2025

(54) MONITORING, SORTING, RPESENTING OBJECTS AND GENERATING A MULTIMEDIA DOCUMENT BY A TERMINAL COMPUTING DEVICE

(71) Applicant: Beijing Bytedance Network Technology Co., Ltd., Beijing (CN)

(72) Inventors: Chi Fang, Beijing (CN); Haizhou Zhu, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 15 days.

(21) Appl. No.: 18/032,776

(22) PCT Filed: Oct. 19, 2021

(86) PCT No.: PCT/CN2021/124757
§ 371 (c)(1),
(2) Date: Apr. 19, 2023

(87) PCT Pub. No.: WO2022/083594
PCT Pub. Date: Apr. 28, 2022

(65) Prior Publication Data
US 2024/0004917 A1    Jan. 4, 2024

(30) Foreign Application Priority Data
Oct. 20, 2020   (CN) .......................... 202011128944.9

(51) Int. Cl.
G06F 16/00 (2019.01)
G06F 16/45 (2019.01)
G06C 7/10 (2006.01)

(52) U.S. Cl.
CPC .............. *G06F 16/45* (2019.01); *G06C 7/10* (2013.01)

(58) Field of Classification Search
None
See application file for complete search history.

(56) References Cited

U.S. PATENT DOCUMENTS 8,606,825 B1 * 12/2013 Matthews ............. H04L 67/535
707/803
11,502,923 B1 * 11/2022 Kumar .................. G06F 16/986
(Continued)

FOREIGN PATENT DOCUMENTS

| CN | 107273433 A | 10/2017 |
|---|---|---|
| CN | 107729483 A | 2/2018 |

(Continued)

OTHER PUBLICATIONS

International Patent Application No. PCT/CN2021/124757; Int'l Written Opinion and Search Report; dated Jan. 26, 2022; 7 pages.

*Primary Examiner* — Polina G Peach
(74) *Attorney, Agent, or Firm* — BakerHostetler

(57) ABSTRACT

Provided are a data processing method and device, a terminal, and a storage medium. The data processing method provided includes: acquiring target objects and attribute information thereof in response to a first instruction; and sorting the target objects and/or the subsidiary information based on the attribute information to obtain a sorting result, wherein the target objects include objects added to or updated by a terminal after the first instruction is triggered. According to the data processing method provided by the disclosure, by acquiring target objects added to or updated by a terminal and respective attribute information corresponding thereto and sorting them based on the attribute information, files or data of different kinds and different sources acquired by the terminal within a specific period of time can be arranged together for the convenience of users to organize them, thereby improving the data processing efficiency.

20 Claims, 5 Drawing Sheets

(56) References Cited

U.S. PATENT DOCUMENTS

| | | | | |
|---|---|---|---|---|
| 2002/0198985 | A1* | 12/2002 | Fraenkel | H04L 41/5009 709/224 |
| 2007/0005581 | A1* | 1/2007 | Arrouye | G06F 7/00 707/E17.14 |
| 2013/0036438 | A1* | 2/2013 | Kutaragi | H04N 21/4821 725/38 |
| 2013/0238999 | A1* | 9/2013 | Helms | G10H 1/0066 715/727 |
| 2014/0149847 | A1* | 5/2014 | Tang | G06F 40/106 715/234 |
| 2015/0023647 | A1* | 1/2015 | Nojima | H04N 7/185 386/201 |
| 2015/0242402 | A1* | 8/2015 | Holm | G06F 16/9024 707/733 |
| 2015/0355782 | A1* | 12/2015 | Zhang | G06F 3/04883 345/178 |
| 2016/0171556 | A1* | 6/2016 | Grewe | G06Q 30/0267 705/14.66 |
| 2017/0034237 | A1* | 2/2017 | Silver | H04N 5/272 |
| 2019/0251188 | A1* | 8/2019 | Luo | G06F 16/116 |
| 2019/0332495 | A1* | 10/2019 | Fair | G06F 16/1734 |
| 2020/0159500 | A1* | 5/2020 | Bodin | G06F 40/30 |
| 2020/0202277 | A1 | 6/2020 | Zhu et al. | |
| 2020/0242085 | A1* | 7/2020 | Shi | G06F 16/285 |
| 2023/0156419 | A1* | 5/2023 | Solvang | H04R 5/027 381/92 |

FOREIGN PATENT DOCUMENTS

| | | |
|---|---|---|
| CN | 108549695 A | 9/2018 |
| CN | 109101500 A | 12/2018 |
| CN | 111428450 A | 7/2020 |
| CN | 111444139 A | 7/2020 |
| CN | 111563015 A | 8/2020 |
| CN | 112256645 A | 1/2021 |
| EP | 2693347 A1 | 2/2014 |

* cited by examiner

MONITORING, SORTING, RPESENTING OBJECTS AND GENERATING A MULTIMEDIA DOCUMENT BY A TERMINAL COMPUTING DEVICE

CROSS REFERENCE TO RELATED APPLICATIONS

The disclosure is the U.S. National Stage of International Application No. PCT/CN2021/124757, titled "DATA PROCESSING METHOD AND DEVICE, TERMINAL. AND STORAGE MEDIUM", filed on Oct. 19, 2021, which claims priority to Chinese Patent Application No. 202011128944.9, field on Oct. 20, 2020, titled "DATA PROCESSING METHOD AND DEVICE, TERMINAL, AND STORAGE MEDIUM", the entire contents of both of which are incorporated herein by reference.

FIELD

The disclosure relates to the field of computer technology, in particular to a data processing method and device, a terminal, and a storage medium.

BACKGROUND

Whether in daily life or at work, smart terminals such as mobile phones are often used as the most important recording tools for users. Users can use their mobile phones to take photos, record audios and videos, and edit documents, etc. The videos, audios, pictures, texts, and documents recorded or downloaded by the mobile phones in the same period of time are often related to each other. For example, when users are in a meeting, they may use their mobile phones to edit meeting records, take meeting videos and photos, record audios and download meeting-related documents at the same time. However, these multimedia data are scattered in various APPs or their corresponding folders, which makes it inconvenient for the users to summarize them in time and causes inevitable omissions when the users manually summarize them afterwards.

SUMMARY

The summary of the invention is provided to introduce in brief the concepts which will be described in detail later in the embodiments. The summary of the invention is neither intended to identify key or necessary features of the claimed technical solutions, nor intended to limit the scope of the claimed technical solutions.

The first aspect of the disclosure provides data processing method, comprising:
  acquiring one or more target objects and respective attribute information of the one or more target objects in response to a first instruction; and
  sorting the one or more target objects and/or subsidiary information of the one or more target objects based on the attribute information to obtain a sorting result,
  wherein the one or more target objects comprise objects added to or updated by a terminal after the first instruction is triggered.

The second aspect of the disclosure provides a data processing device, comprising:
  an acquisition unit, configured to acquire one or more target objects and respective attribute information of the one or more target objects in response to a first instruction; and
  a sorting unit, configured to sort the one or more target objects and/or subsidiary information of the one or more target objects based on the attribute information to obtain a sorting result,
  wherein the one or more target objects comprise objects added to or updated by a terminal after the first instruction is triggered.

The third aspect of the disclosure provides a terminal, comprising:
  at least one processor; and
  at least one memory communicatively coupled to the at least one processor and storing instructions that upon execution by the at least one processor cause the terminal to perform the data processing method provided by the disclosure.

The fourth aspect of the disclosure provides a non-transitory computer-readable storage medium, storing program instructions that upon execution by a computing device, cause the computing device to perform the data processing method provided by the disclosure.

According to the data processing method provided by the embodiment of the disclosure, by acquiring target objects added to or updated by a terminal and respective attribute information corresponding thereto and sorting them based on the attribute information, files or data of different kinds and different sources acquired by the terminal in a specific period of time can be arranged together for the convenience of users to organize them, thereby improving the data processing efficiency.

BRIEF DESCRIPTION OF THE DRAWINGS

The above and other features, advantages and aspects of various embodiments of the disclosure will become more apparent with reference to the accompanying drawings and specific implementations below. The same or similar reference numerals throughout the drawings denote the same or similar elements. It should be understood that the drawings are schematic and the originals and elements are not necessarily drawn to scale.

DETAILED DESCRIPTION OF EMBODIMENTS

Figure 1:
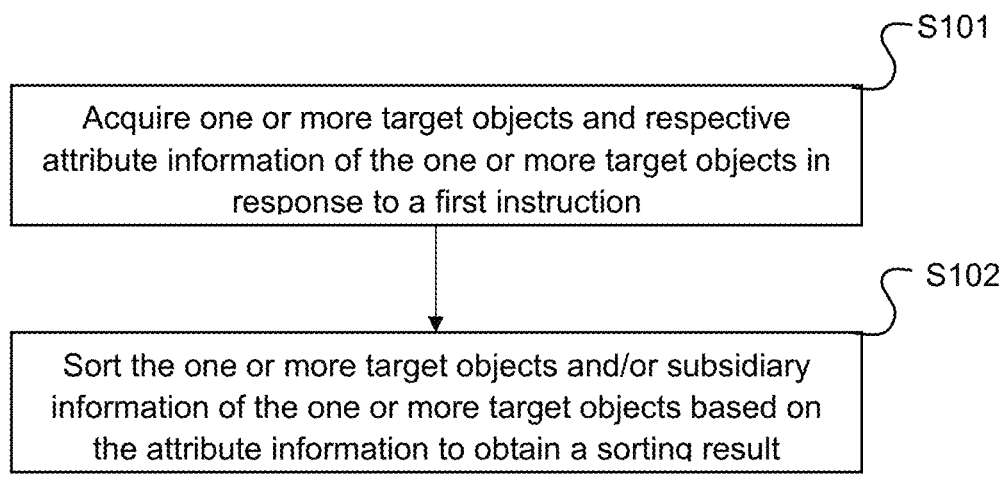
FIG. 1 is a flowchart of a data processing method provided by an embodiment of the disclosure.

The embodiments of the disclosure will be described in more detail below with reference to the accompanying drawings. Although some embodiments of the disclosure are shown in the accompanying drawings, it should be understood that the disclosure may be implemented in various forms and should not be construed as being limited to the embodiments described herein, on the contrary, these embodiments are provided for a more thorough and complete understanding of the disclosure. It should be understood that the accompanying drawings and embodiments of the disclosure are merely illustrative, rather than limiting the scope of protection of the disclosure.

It should be understood that the steps described in the embodiments of the disclosure may be performed according to different orders and/or in parallel. In addition, the embodiments may include additional steps and/or omit the execution of the shown steps. The scope of the disclosure is not limited in this aspect.

The term "comprising" used herein and variants thereof means open-ended including, i.e., "comprising, but not limited to". The term "based on" refers to "based at least in part on". The term "one embodiment" represents "at least one embodiment"; the term "the other embodiment" represents "at least one additional embodiment"; and the term "some embodiments" represents "at least some embodiments". The term "in response to" and related terms mean that one signal or event is influenced to some extent by another signal or event, but not necessarily completely or directly. If an event (e.g., "x") occurs in response to another event (e.g., "y"), x can be directly or indirectly in response to y. For example, the occurrence of y can eventually result in the occurrence of x, but there may be other intermediate events and/or conditions. In other scenarios, y may not necessarily result in the occurrence of x, and x may occur even though y has not occurred. In addition, the term "in response to" can also mean "at least partially in response to". The term "determining" comprises a wide variety of actions, including processing, looking up (e.g., looking up in a database, a table, or another data structure), deriving, computing, calculating, investigating, ascertaining and the like, and may include receiving, accessing (e.g., accessing data in a memory) and the like, as well as parsing, selecting, choosing, establishing and the like. Definitions of other terms will be provided in the description below.

It should be noted that the terms such as "first", "second" and the like mentioned in the disclosure are merely intended to distinguish different devices, modules, or units, rather than limiting an order of functions executed by these devices, modules or units or an interdependence among these devices, modules, or units.

It should be noted that the modifications of "a" and "multiple" mentioned in the disclosure are illustrative, but are not restrictive. It should be understood by those skilled in the art that it should be understood as "one or more" unless otherwise specified in the context.

Names of messages or information interacted among a plurality of devices in the embodiments of the disclosure are merely for an illustrative purpose, rather than limiting the scope of these messages or information.

With reference to FIG. 1, a data processing method 100 provided by an embodiment of the disclosure is shown, including steps S101 and S102.

Step S101: Acquire one or more target objects and respective attribute information of the one or more target objects in response to a first instruction.

The first instruction may be triggered by a physical key, virtual key, touch operation, gesture or voice; the target object include an object added to or updated by a terminal after the first instruction is triggered, and may include, but are not limited to, a picture, a video, an audio, a document, and contents input and edited by a user through specific applications, such as memos and notes; the attribute information may include, but is not limited to, creation time, update time, name, source, file type of the target objects, etc. Exemplarily, after the user triggers the physical or virtual key on the terminal, the terminal begins to continuously monitor the event of objects being added to or updated thereafter in the terminal.

In some embodiments, the types of the target objects may be predetermined by a system or set based on instructions from the user or remote server.

In some embodiments, the acquisition of the one or more target objects may be stopped when an instruction for stopping the acquisition of the one or more target objects is received, or after the duration or amount of the acquisition of the one or more target objects exceeds a predetermined threshold.

In some embodiments, the one or more target objects are associated with more than two applications. Exemplarily, the applications include a camera application, a recording application, and a text editing application, and the target objects may be photos or videos captured by the camera application, audio files captured by the recording application, or text contents recorded by the text editing application.

In some embodiments, configuration information of target applications is acquired, and paths where files should be saved to in the target applications are acquired according to the configuration information, so that the one or more target objects are acquired according to the paths. The target applications include, but are not limited to, camera application, recording application, clipboard application, memo application, note application, etc.

Step S102: Sort the one or more target objects and/or subsidiary information of the one or more target objects based on the attribute information to obtain a sorting result.

The subsidiary information is information associated with the one or more target objects, including but not limited to information, class information, file size information, format information, storage path, or information of the application from which the target object sources originated, etc.

In some embodiments, the one or more target objects and/or the subsidiary information of the one or more target objects may be sorted based on one or more kinds of attribute information. Exemplarily, the one or more target objects may be sorted in order of file types of audios, videos, pictures, and texts, and the one or more target objects of the same file type are sorted in order of time.

According to the data processing method provided by the embodiment of the disclosure, one or more target objects added to or updated by a terminal and respective attribute information corresponding thereto are acquired and sorted based on the attribute information, and files or data of different kinds and different sources acquired by the terminal within a specific period of time can be arranged together, which is convenient for a user to sort, thereby improving data processing efficiency.

In some embodiments, step S101 includes: continuously monitoring events of the one or more target objects being added to or updated by the terminal in response to the first instruction; and step S102 includes: sorting the one or more target objects being added to or updated by the terminal and/or subsidiary information of the one or more target objects based on the attribute information of the one or more target objects. In this embodiment, the terminal may continuously monitor the event of adding or updating target objects in response to the first instruction, sort the target objects in real time based on the attribute information thereof, and update the sorting result in real time.

In some embodiments, the method 100 further includes:
displaying the one or more target objects and/or the subsidiary information of the one or more target objects in a predetermined user interface based on the sorting result.

The predetermined user interface includes, but is not limited to, an application interface, a file interface, a folder interface, or the like. This step may be used to display the sorting result of step S102. Alternatively, the predetermined user interface may be opened or hidden in response to a user operation. For example, when the predetermined user interface is not opened or hidden, the predetermined user interface may be indicated by a control such as an icon or floating window, at which time the terminal may execute steps S101 and S102 in the background, and when the user clicks the icon or floating window, the sorting result are displayed in the predetermined user interface in real time.

The one or more target objects are displayed in the predetermined user interface by means of displaying all or part of the one or more target objects, or displaying respective identifiers referring to the one or more target objects, including icons, thumbnails, compressed pictures, etc. Exemplarily, when the target object is a document, the icon of the document is displayed; when the target object is a picture, the original or thumbnail of the picture is displayed; and when the target object is a video, the icon of the video or the frame screenshot or GIF of the video is displayed.

In some embodiments, the identifier of the target objects may include a hyperlink to the original files or folders corresponding to the target object.

It should be noted that the foregoing method of displaying the target objects is only an example, and the target objects may also be displayed in other ways, which are not limited in this embodiment.

Figure 2:
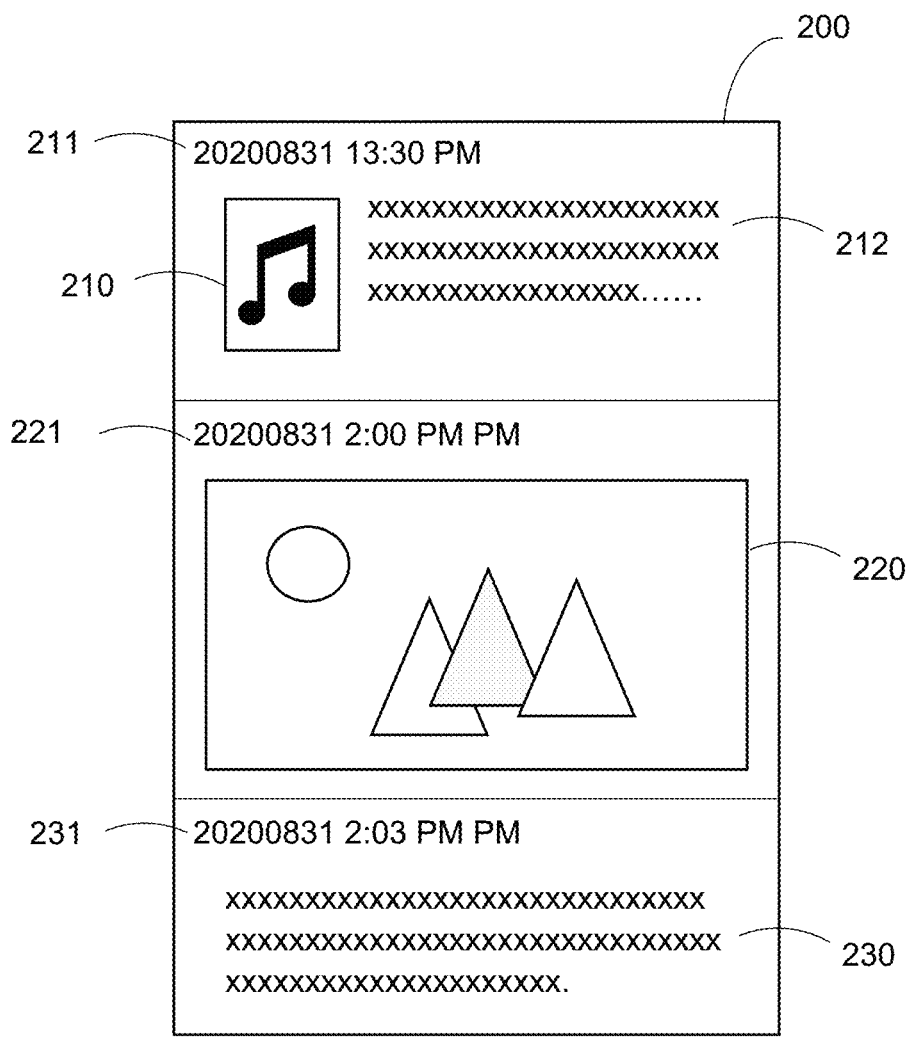
FIG. 2 is a schematic diagram of a user interface provided by an embodiment of the disclosure.

Refer to FIG. 2, which illustrates a schematic diagram of a user interface provided according to an embodiment of the disclosure. The user interface 200 displays target objects 210, 220 and 230 with subsidiary information 211 and 212 corresponding to the target object 210, subsidiary information 221 corresponding to the target object 220, and subsidiary information 231 corresponding to the target object 230, which are sorted based on the creation time. The target object 210 is an audio file, and the subsidiary information 212 is part of the text content converted from the audio file; the target object 220 is a picture, which may be displayed in a compressed format in the user interface 200; the target object 230 is text edited by a user through a memo program; and the subsidiary information 211, 221 and 231 are the creation times corresponding to the target objects 210, 220 and 230, respectively.

In some embodiments, the data processing method further includes:
step b11: stop monitoring the event of the one or more target objects being added to or updated by the terminal in response to a second instruction;
step b12: generate, based on the sorting result, a document for displaying the sorting result.

The second instruction may be triggered by a physical key, virtual key, touch operation, gesture, or voice. In this embodiment, the user may stop monitoring the event of the one or more target objects through the second instruction and a document for displaying the sorting result may be generated, thus facilitating the user to process the target objects based on the document afterwards. Exemplarily, the file may be a configuration file for generating the predetermined user interface, and the user may click the file to open the predetermined user interface that displays the corresponding sorting result.

In some embodiments, the terminal has a mechanical lever configured to be toggled at least between a first position and a second position; step S101 includes: continuously monitoring events of the one or more target objects being added to or updated by the terminal in response to the mechanical lever being at the first position; and step b11 includes: stopping monitoring the events of one or more target objects being added to or updated by the terminal in response to the mechanical lever being at the second position.

In this embodiment, when the mechanical lever is at the first position, the terminal continuously monitors the events and sorts the added to or updated one or more target objects, and when the mechanical lever is at the second position, the terminal stops monitoring the events. In this way, by matching whether the terminal is monitoring the events with the position of the lever, the user can determine the monitoring status of the events through the position of the lever without lighting up the lock screen or entering a predetermined user interface. In addition, the first instruction and the second instruction are triggered by the mechanical lever of the terminal, so that the user does not need to unlock the terminal to open related applications and the like, which can improve the interaction efficiency.

In some embodiments, the one or more target objects further include objects added to or updated by the terminal during a specified period of time or within a specified number of objects. Exemplarily, the target objects may include objects added to or updated by the terminal within a period of time specified by system default settings, the user, or a remote server. In one embodiment, the user may limit the target objects to target objects added to or updated by the terminal within a period of time on a certain day, and the terminal may acquire the target objects added to or updated by the terminal and respective attribute information corresponding thereto within the certain period of time on the certain day and performing the subsequent step of sorting. In another embodiment the one or more target objects may include first N target objects added or updated by the terminal (N≥1), where the value of N may be defaulted by the system or specified by the user or remote server, for example, the user may specify the target objects as the 100 most recently added or updated target objects of the terminal. Thus, in this embodiment, by acquiring the target objects of the terminal during a specified period of time or within a specified number of objects, the user can be allowed to trace back the target objects added to or updated by the terminal within a specific period of time or within a specific number of objects, even after forgetting to trigger instruction for real-time sorting of target objects.

In some embodiments, the subsidiary information includes a link corresponding to the target object, the link being used to link to the target object. In this way, the user can directly click on the subsidiary information of a target object to go to the actual location where the target object is saved or to open the original file corresponding to the target object.

In some embodiments, step S101 includes:
detect target folders in response to the first instruction;
acquire the one or more target objects in the target folders and respective attribute information of the one or more target objects.

In some embodiments, the method 100 further includes:
displaying in the predetermined user interface, according to a user operation, a target object specified by the user that is not currently displayed in the predetermined user interface; or, deleting, according to a user operation, a target object and/or the subsidiary information of the target object in the predetermined user interface; or, adjusting, according to a user operation, the display order of the one or more target objects and/or the subsidiary information of the one or more target objects in the predetermined user interface.

In this embodiment, objects can be added or deleted or the display order of objects can be adjusted in the predetermined user interface according to the user operation, which helps the user to sort files. Exemplarily, the user can drag objects displayed in other interfaces, such as a desktop display, to the predetermined user interface. Similarly, the user can also move or copy the one or more target objects currently displayed in the predetermined user interface to another user interface.

Further, in some embodiments, the method 100 further includes: updating the sorting result according to the user operation. In this embodiment, a sorting result consistent with the user-adjusted display of the predetermined user interface can be generated based on the user's operation, so that the sorting result can be updated according to the user operation on the predetermined user interface.

In some embodiments, the predetermined user interface is displayed on a top layer of a display interface of the terminal, and the predetermined user interface is capable of being moved and hidden according to user instructions. Exemplarily, the predetermined user interface may be a floating window that can be expanded and hidden.

In some embodiments, the method 100 further includes: if the one or more of the target objects are audio files, generating text corresponding to the audio files based on the audio files, where the subsidiary information includes at least part of the text. In this embodiment, the audio files are converted into text and displayed in the user interface, which makes it easier for the user to quickly identify the contents of the audio files and to facilitate the subsequent use of the audio file by the user.

In some embodiments, the method 100 further includes: generating a document based on the one or more target objects and/or subsidiary information displayed in the predetermined user interface. The content of the generated document includes at least one target object and/or subsidiary information displayed in the user interface. The format of the document includes, but is not limited to, docx, doc, pdf, html, etc. Exemplarily, in response to a user instruction, a note can be generated based on the target objects displayed in the user interface or target objects selected by the user among the foregoing target objects. The target object in the form of the text is still displayed as text in the note, and the target object in the form of pictures is still displayed as a picture in the note. In one embodiment, the pictures can be displayed adaptively in the document according to the width of the document.

Figure 3:
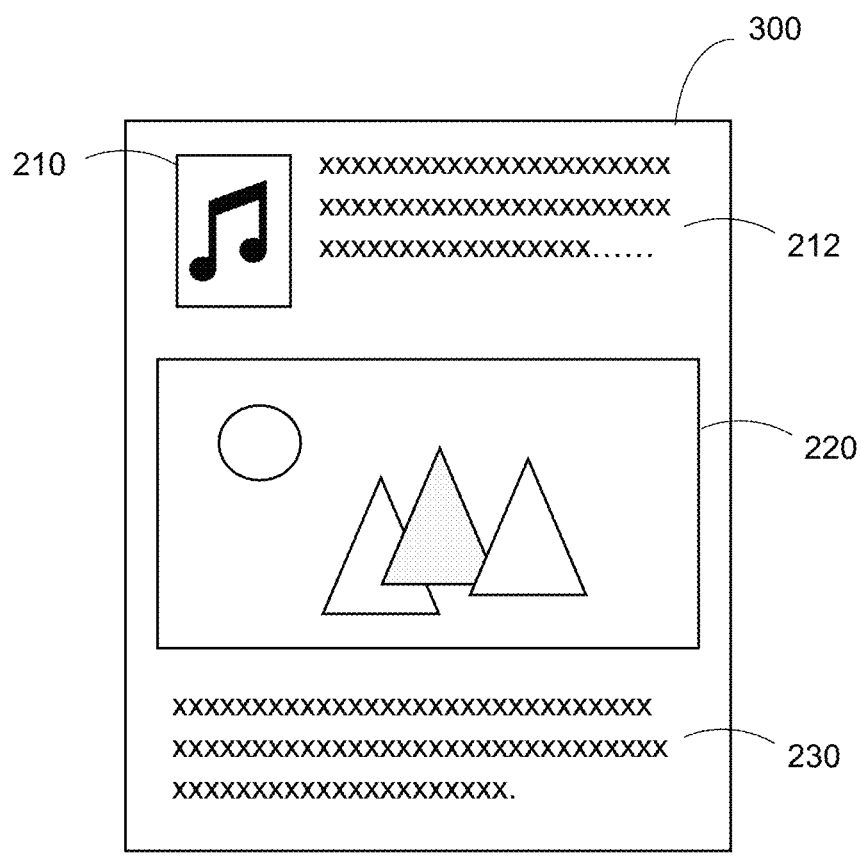
FIG. 3 is a schematic diagram of a document provided by an embodiment of the disclosure.

Refer to FIG. 3, which shows a schematic diagram of a document generated based on the user interface shown in FIG. 2. The document 300 currently displays target objects 210, 220 and 230 and subsidiary information 212 corresponding to the target object 210. The target object 210 is an audio file, and the subsidiary information 212 is part of the text converted from the audio file; exemplarily, the target object 210 may be embedded in the document 300 as an icon with a hyperlink; the target object 220 is a picture file, which may be embedded in the document 300 in a compressed format and adapted to the width of the document 300; and the target object 230 is text edited by the user through a memo program and is displayed below the target object 220.

Thus, in this embodiment, a multimedia document with pictures and texts can be automatically generated based on the target objects displayed in the user interface, which helps the user to record meetings, draft news articles, etc.

Figure 4:
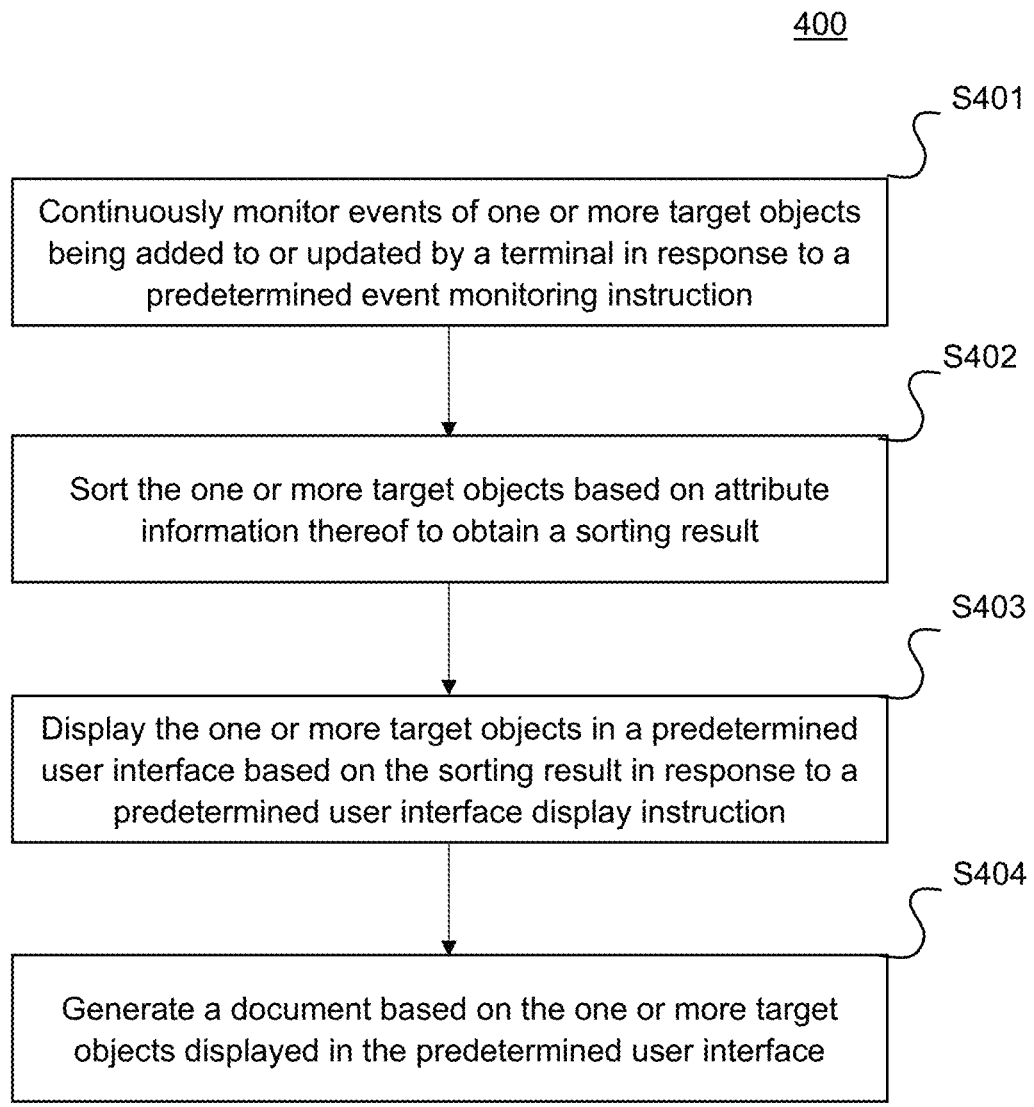
FIG. 4 is a flowchart of a data processing method provided by another embodiment of the disclosure.

With reference to FIG. 4, a data processing method 400 provided by another embodiment of the disclosure is shown, including steps S401-S404.

Step S401: continuously monitor events of one or more target objects being added to or updated by a terminal in response to a predetermined event monitoring instruction;

Step S402: sort the one or more target objects based on attribute information thereof to obtain a sorting result;

Step S403: display the one or more target objects in a predetermined user interface based on the sorting result in response to a predetermined user interface display instruction;

Step S404: generate a document based on the one or more target objects displayed in the predetermined user interface.

Figure 5:
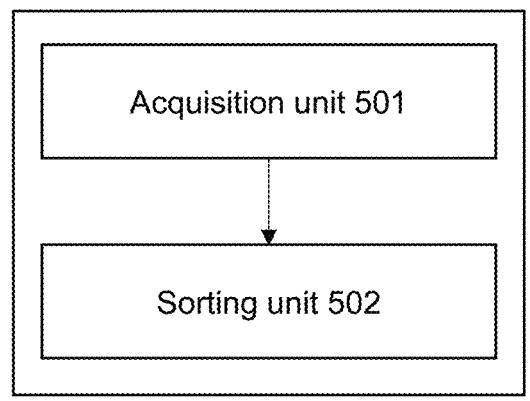
FIG. 5 is an exemplary structural block diagram of a data processing device provided by an embodiment of the disclosure.

Corresponding to the data processing method provided by the foregoing embodiments, the disclosure further provides a data processing device 500. As shown in FIG. 5, the device 500 includes an acquisition unit 501 and a sorting unit 502.

The acquisition unit 501 is configured to acquire one or more target objects and respective attribute information of the one or more target objects in response to a first instruction; and The sorting unit 502 is configured to sort the one or more target objects and/or subsidiary information of the one or more target objects based on the attribute information to obtain a sorting result.

The one or more target objects include objects added to or updated by a terminal after the first instruction is triggered.

According to the data processing device provided by the embodiment of the disclosure, by acquiring target objects added to or updated by a terminal and respective attribute information corresponding thereto and sorting them based on the attribute information, files or data of different kinds and different sources acquired by the terminal in a specific period of time can be arranged together for the convenience of users to organize them, thereby improving the data processing efficiency.

Since the apparatus embodiment basically corresponds to the method embodiments, the relevant part can refer to the part of the description of the method embodiments. The apparatus embodiment described above is merely illustrative, and the units described as separate units may or may not be separate. Some or all of the units can be selected according to actual needs to achieve the objects of the solutions of the embodiments. Those of ordinary skill in the art can understand and implement without creative work.

In some embodiments, the acquisition unit includes: a monitoring unit, configured to continuously monitor events of the one or more target objects being added to or updated by the terminal in response to the first instruction; and step S102 includes: sorting the one or more target objects being added to or updated by the terminal and/or subsidiary information of the one or more target objects based on the attribute information of the one or more target objects. In this embodiment, the terminal may continuously monitor the event of adding or updating target objects in response to the first instruction, sort the target objects in real time based on the attribute information thereof, and update the sorting result in real time.

In some embodiments, the device further includes:
a displaying unit configured to display the one or more target objects and/or the subsidiary information of the one or more target objects in a predetermined user interface based on the sorting result.

In some embodiments, the device further includes:
a monitoring stopping unit configured to stop monitoring the event of the one or more target objects being added to or updated by the terminal in response to a second instruction;
a document generation unit configured to generate, based on the sorting result, a document for displaying the sorting result.

The second instruction may be triggered by a physical key, virtual key, touch operation, gesture, or voice. In this embodiment, the user may stop monitoring the event of the one or more target objects through the second instruction and a document for displaying the sorting result may be generated, thus facilitating the user to process the target objects based on the document afterwards. Exemplarily, the file may be a configuration file for generating the predetermined user interface, and the user may click the file to open the predetermined user interface that displays the corresponding sorting result.

In some embodiments, the terminal has a mechanical lever configured to be toggled at least between a first position and a second position; the monitoring stopping unit is configured to: continuously monitor events of the one or more target objects being added to or updated by the terminal in response to the mechanical lever being at the first position; and the document generation unit is configured to stop monitoring the events of one or more target objects being added to or updated by the terminal in response to the mechanical lever being at the second position.

In this embodiment, when the mechanical lever is at the first position, the terminal continuously monitors the events and sorts the added to or updated one or more target objects, and when the mechanical lever is at the second position, the terminal stops monitoring the events. In this way, by matching whether the terminal is monitoring the events with the position of the lever, the user can determine the monitoring status of the events through the position of the lever without lighting up the lock screen or entering a predetermined user interface. In addition, the first instruction and the second instruction are triggered by the mechanical lever of the terminal, so that the user does not need to unlock the terminal to open related applications and the like, which can improve the interaction efficiency.

In some embodiments, the acquisition unit includes:
a detection subunit, configured to detect target folders in response to the first instruction;
an acquisition subunit configured to acquire the one or more target objects in the target folders and respective attribute information of the one or more target objects.

In some embodiments, the device further includes:
an editing unit, configured to display in the predetermined user interface, according to a user operation, a target object specified by the user that is not currently displayed in the predetermined user interface, or, to delete, according to a user operation, a target object and/or the subsidiary information of the target object in the predetermined user interface, or, to adjust, according to a user operation, the display order of the one or more target objects and/or the subsidiary information of the one or more target objects in the predetermined user interface.

In this embodiment, objects can be added or deleted or the display order of objects can be adjusted in the predetermined user interface according to the user operation, which helps the user to sort files. Exemplarily, the user can drag objects displayed in other interfaces, such as a desktop display, to the predetermined user interface. Similarly, the user can also move or copy the one or more target objects currently displayed in the predetermined user interface to another user interface.

In some embodiments, the device further includes:
an editing updating unit, configured to update the sorting result according to the user operation. In this embodiment, a sorting result consistent with the user-adjusted display of the predetermined user interface can be generated based on the user's operation, so that the sorting result can be updated correspondingly according to the user operation on the predetermined user interface.

In some embodiments, the predetermined user interface is displayed on a top layer of a display interface of the terminal, and the predetermined user interface is capable of being moved and hidden according to user instructions. Exemplarily, the predetermined user interface may be a floating window that can be expanded and hidden.

In some embodiments, the device further includes:
a voice recognition unit, configured to, if the one or more of the target objects are audio files, generate text corresponding to the audio files based on the audio files, where the subsidiary information includes at least part of the text. In this embodiment, the audio files are converted into text and displayed in the user interface, which makes it easier for the user to quickly identify the contents of the audio files and to facilitate the subsequent use of the audio file by the user.

In some embodiments, the device further includes:
a document generating unit, configured to generate a document based on the one or more target objects and/or subsidiary information displayed in the predetermined user interface. The content of the generated document includes at least one target object and/or subsidiary information displayed in the user interface. The format of the document includes, but is not limited to, docx, doc, pdf, html, etc. Exemplarily, in response to a user instruction, a note can be generated based on the target objects displayed in the user interface or target objects selected by the user among the foregoing target objects. The target object in the form of the text is still displayed as text in the note, and the target object in the form of pictures is still displayed as a picture in the note. In one embodiment, the pictures can be displayed adaptively in the document according to the width of the document.

Figure 6:
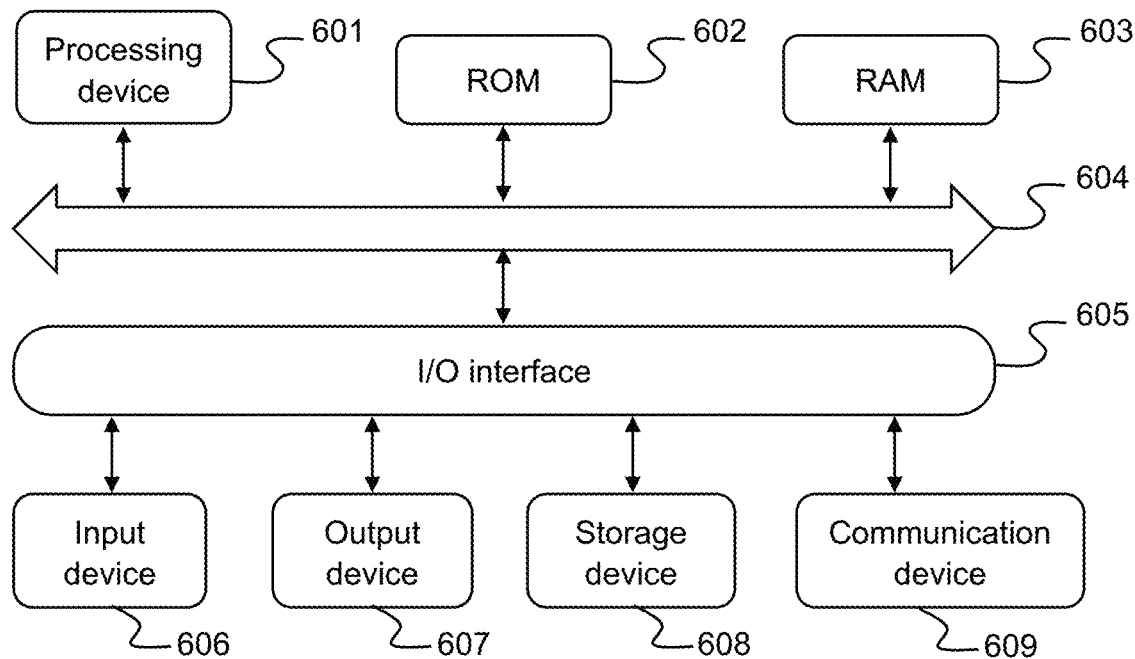
FIG. 6 is a schematic structural diagram of a terminal for implementing the embodiments of the disclosure.

Referring now to FIG. 6, a structural schematic diagram of terminal equipment 600 suitable for implementing an embodiment of the disclosure is shown. The terminal equipment in the embodiment of the present disclosure can include, but is not limited to, mobile terminals such as a mobile phone, a notebook computer, a digital broadcast receiver, a personal digital assistant (PDA), a Pad, a portable media player (PMP) and a vehicle-mounted terminal (e.g., vehicle-mounted navigation terminal), and fixed terminals such as a digital TV and a desktop computer. The terminal equipment shown in FIG. 6 is only an example, and should not bring any restrictions on the functions and application scope of the embodiments of the present disclosure.

As shown in FIG. 6, the terminal equipment 600 can comprise a processing device (e.g., central processing unit, graphics processor, etc.) 601, which can perform various appropriate actions and processing according to a program stored in a read-only memory (ROM) 602 or a program loaded into a random access memory (RAM) 603 from a storage device 608. In the RAM 603, various programs and data required for the operation of the terminal equipment 600 are also stored. The processing device 601, the ROM 602, and the RAM 603 are connected through a bus 604. An Input/Output (I/O) interface 605 is also connected to the bus 604.

Generally, the following devices can be connected to the I/O interface 605: an input device 606 such as a touch screen, a touch pad, a keyboard, a mouse, a camera, a microphone, an accelerometer, and a gyroscope; an output device 607 such as a liquid crystal display (LCD), a speaker and a vibrator; a storage device 608 such as a magnetic tape and a hard disk; and a communication device 609. The communication device 609 can allow the terminal equipment 600 to perform wireless or wired communication with other equipment to exchange data. Although FIG. 6 shows the terminal equipment 600 with various devices, it should be understood that it is not required to implement or provide all the devices shown. More or fewer devices may alternatively be implemented or provided.

Particularly, according to the embodiments of the disclosure, the processes described above with reference to the flowcharts may be implemented as computer software programs. For example, the embodiments of the disclosure comprise a computer program product comprising a computer program carried by a computer-readable medium, and the computer program contains program codes for executing the method shown in the flowcharts. In such embodiment, the computer program can be downloaded and installed from a network through the communication device 609, or installed from the storage device 608, or installed from the ROM 602. When the computer program is executed by the processing device 601, the above functions defined in the method of the embodiments of the disclosure are executed.

It should be noted that the above-mentioned computer-readable medium can be a computer-readable signal medium or a computer-readable storage medium or any combination of the two. The computer-readable storage medium may be, for example, but not limited to, an electrical, magnetic, optical, electromagnetic, infrared or semiconductor system, device or component, or any combination of the above. More specific examples of the computer-readable storage medium may include, but are not limited to, an electrical connector with one or more wires, a portable computer disk, a hard disk, an RAM, an ROM, an electrically erasable programmable read only memory (EPROM) or flash memory, an optical fiber, a portable compact disc read-only memory (CD-ROM), an optical storage device, a magnetic storage device, or any suitable combination of the above. In the disclosure, the computer-readable storage medium can be any tangible medium containing or storing a program, which can be used by or in combination with an instruction execution system, device, or component. In the disclosure, the computer-readable signal medium can comprise a data signal propagated in a baseband or as part of a carrier wave, in which computer-readable program codes are carried. This propagated data signal can take various forms, including but not limited to an electromagnetic signal, an optical signal, or any suitable combination of the above. The computer-readable signal medium can also be any computer-readable medium other than the computer-readable storage medium, and the computer-readable signal medium can send, propagate, or transmit the program for use by or in connection with the instruction execution system, device, or component. The program codes contained in the computer-readable medium can be transmitted by any suitable medium, including but not limited to electric wire, optical cable, radio frequency (RF) or any suitable combination of the above.

In some embodiments, the client and the server can use any currently known or future developed network protocols such as HTTP (HyperText Transfer Protocol) to communicate, and can communicate with any form or medium digital data communications (e.g., communications networks) interconnected. Examples of communication networks include local area networks ("LAN"), wide area networks ("WAN"), the Internet, and peer-to-peer networks (e.g., ad hoc peer-to-peer networks), as well as any currently known or future developed network.

The computer-readable medium can be included in the terminal equipment, and can also exist alone without being assembled into the terminal equipment.

The computer-readable medium carries one or more programs, and when the one or more programs are executed by the terminal equipment, the terminal equipment is caused to: acquire one or more target objects and respective attribute information of the one or more target objects in response to a first instruction, and sort the one or more target objects and/or subsidiary information of the one or more target objects based on the attribute information to obtain a sorting result, wherein the one or more target objects comprise objects added to or updated by a terminal after the first instruction is triggered.

Computer program codes for performing the operations of the disclosure can be written in one or more programming languages or a combination thereof, including object-oriented programming languages such as JAVA®, SMALLTALK®, C++, and conventional procedural programming languages such as "C" language or similar programming languages. The program code can be completely or partially executed on a user computer, executed as an independent software package, partially executed on a user computer, and partially executed on a remote computer, or completely executed on a remote computer or server. In a case involving a remote computer, the remote computer can be connected to a user computer through any kind of network including a local area network (LAN) or a wide area network (WAN), or can be connected to an external computer (e.g., connected through the Internet using an Internet service provider).

The flowcharts and block diagrams in the drawings show the architectures, functions, and operations of possible implementations of systems, methods, and computer program products according to various embodiments of the disclosure. In this regard, each block in the flowchart or block diagram can represent a module, a program segment or part of a code that contains one or more executable instructions for implementing a specified logical function. It should also be noted that in some alternative implementations, the functions noted in the blocks can also occur in a different order from those noted in the drawings. For example, two consecutive blocks can actually be executed in substantially parallel, and sometimes they can be executed in reverse order, depending on the functions involved. It should also be noted that each block in the block diagrams and/or flowcharts, and combinations of blocks in the block diagrams and/or flowcharts, can be implemented with dedicated hardware-based systems that perform specified functions or actions, or can be implemented with combinations of dedicated hardware and computer instructions.

The modules or units described in the embodiments of the disclosure can be implemented by software or hardware. The name of a module or unit does not constitute a limitation to the module or unit itself under certain circumstances. For example, the task determination unit can also be described as "a unit for determining whether a view of a first task is currently displayed on a desktop".

The functions described herein above may be performed, at least in part, by one or more hardware logic components. For example, exemplary types of hardware logic components that may be used include: Field Programmable Gate Arrays (FPGAs), Application Specific Integrated Circuits (ASICs), Application Specific Standard Products (ASSPs), Systems on Chips (SOCs), Complex Programmable Logical Devices (CPLDs) and etc.

In the context of the present disclosure, a machine-readable medium may be a tangible medium that may contain or store programs for use by or in combination with an instruction execution system, device, or device. The machine-readable medium may be a machine-readable signal medium or a machine-readable storage medium. Machine readable media may include, but are not limited to, electronic, magnetic, optical, electromagnetic, infrared, or semiconductor systems, devices or devices, or any suitable combination of the above. More specific examples of machine-readable storage media will include electrical connections based on one or more lines, portable computer disks, hard disks, random access memory (RAM), read only memory (ROM), erasable programmable read only memory (EPROM or flash memory), optical fibers, portable compact disk read only memory (CD-ROM), optical storage devices, magnetic storage devices or any suitable combination of the above.

In some embodiments, the disclosure provides a data processing method, comprising: acquiring one or more target objects and respective attribute information of the one or more target objects in response to a first instruction; and sorting the one or more target objects and/or subsidiary information of the one or more target objects based on the attribute information to obtain a sorting result, wherein the one or more target objects comprise objects added to or updated by a terminal after the first instruction is triggered.

In some embodiments, the acquiring one or more target objects and respective attribute information of the one or more target objects in response to a first instruction comprises: continuously monitoring events of the one or more target objects being added to or updated by the terminal in response to the first instruction, and wherein the sorting the one or more target objects and/or subsidiary information of the one or more target objects based on the attribute information to obtain a sorting result comprises: sorting the one or more target objects being added to or updated by the terminal and/or the subsidiary information of the one or more target objects based on the attribute information of the one or more target objects.

In some embodiments, the data processing method further comprises: displaying the one or more target objects and/or the subsidiary information of the one or more target objects in a predetermined user interface based on the sorting result.

In some embodiments, the data processing method further comprises: stopping monitoring the events of the one or more target objects added to or updated by the terminal in response to a second instruction; and generating, based on the sorting result, a document for displaying the sorting result.

In some embodiments, the terminal has a mechanical lever configured to be toggled at least between a first position and a second position; the continuously monitoring events of the one or more target objects being added to or updated by the terminal in response to the first instruction comprises: continuously monitoring events of the one or more target objects being added to or updated by the terminal in response to the mechanical lever being at the first position; and the stopping monitoring the events of the one or more target objects added to or updated by the terminal in response to a second instruction comprises: stopping monitoring the events of the one or more target objects added to or updated by the terminal in response to the mechanical lever being at the second position.

In some embodiments, the one or more target objects further comprise objects added to or updated by the terminal during a specified period of time or within a specified number of objects.

In some embodiments, the target objects comprise one or more of the following: a picture, a video, an audio, and a document.

In some embodiments, the attribute information comprises one or more of the following: object creation time, object update time, object name, object source, and object type.

In some embodiments, the subsidiary information comprise a link corresponding to the target object, the link being used to link to the target object.

In some embodiments, the acquiring one or more target objects and respective attribute information of the one or more target objects in response to a first instruction comprises: detecting target folders in response to the first instruction; and acquiring the one or more target objects in the target folders and respective attribute information of the one or more target objects.

In some embodiments, the data processing method further comprises: displaying in the predetermined user interface, according to a user operation, a target object specified by the user that is not currently displayed in the predetermined user interface; or, deleting, according to a user operation, a target object and/or the subsidiary information of the target object in the predetermined user interface; or, adjusting, according to a user operation, the display order of the one or more target objects and/or the subsidiary information of the one or more target objects in the predetermined user interface.

In some embodiments, the data processing method further comprises: updating the sorting result according to the user operation.

In some embodiments, the predetermined user interface is displayed on a top layer of a display interface of the terminal, and the predetermined user interface is capable of being moved and hidden according to user instructions.

In some embodiments, the data processing method further comprises: generating a document based on the one or more target objects and/or the subsidiary information of the one or more target objects displayed in the predetermined user interface.

In some embodiments, the data processing method further comprises: if one or more of the target objects are audio files, generating text corresponding to the audio files based on the audio files, wherein the subsidiary information comprises at least part of the text.

In some embodiments, the disclosure provides a data processing device, comprising: an acquisition unit, configured to acquire one or more target objects and respective attribute information of the one or more target objects in response to a first instruction; and a sorting unit, configured to sort the one or more target objects and/or subsidiary information of the one or more target objects based on the attribute information to obtain a sorting result, wherein the one or more target objects comprise objects added to or updated by a terminal after the first instruction is triggered.

In some embodiments, the disclosure further provides a terminal comprising: at least one processor; and at least one memory communicatively coupled to the at least one processor and storing instructions that upon execution by the at least one processor cause the terminal to perform the data processing method provided by one or more embodiments according to the disclosure.

In some embodiments, the disclosure further provides a non-transitory computer storage medium storing program instructions that upon execution by a computing device, cause the computing device to perform the data processing method provided by one or more embodiments according to the disclosure.

The above description is only a preferred embodiment of the disclosure and an explanation of the applied technical principles. Those skilled in the art should understand that the scope of disclosure involved in this disclosure is not limited to the technical solutions formed by the specific combination of the above technical features, and should also cover other technical solutions formed by any combination of the above technical features or their equivalent features without departing from the above disclosed concept. For example, the above-mentioned features and the technical features disclosed in (but not limited to) the disclosure having similar functions are replaced with each other to form a technical solution.

In addition, although the operations are depicted in a specific order, it should not be understood as requiring these operations to be performed in the specific order shown or performed in a sequential order. Under certain circumstances, multitasking and parallel processing may be advantageous. Likewise, although several specific implementation details are included in the above discussion, these should not be construed as limiting the scope of the disclosure. Certain features that are described in the context of separate embodiments may also be implemented in combination in a single embodiment. Conversely, various features that are described in the context of a single embodiment may also be implemented in multiple implementations individually or in any suitable sub-combination.

Although the subject matter has been described in a language specific to structural features and/or logical actions of the method, it should be understood that the subject matter defined in the appended claims is not necessarily limited to the specific features or actions described above. On the contrary, the specific features and actions described above are merely exemplary forms of implementing the claims.

What is claimed is:

1. A method of improving data processing efficiency of a terminal computing device, comprising:
   continuously monitoring a plurality of target objects added to or updated by the terminal computing device associated with a user in response to a first instruction, wherein the plurality of target objects are contents created or updated by the user utilizing a plurality of target applications;
   acquiring configuration information of the plurality of target applications;
   determining a plurality of file saving paths corresponding to the plurality of target objects based on the configuration information of the plurality of target application;
   acquiring the plurality of target objects based on the plurality of file saving paths;
   sorting, by the terminal computing device in real time, the plurality of target objects based on types and creation times corresponding to the plurality of target objects to obtain a sorting result;
   displaying, in a predetermined interface of the terminal computing device configured to display contents generated by different target applications on the same interface, representatives of at least one subset of the plurality of target objects based on the sorting result, wherein the at least one subset of the plurality of target objects are generated by different target applications among the plurality of application;
   generating, by the terminal computing device, a multimedia document based on the at least one subset of the plurality of target objects; and
   generating, by the terminal computing device, a configuration file corresponding to the predetermined interface in response to stopping monitoring the plurality of target object, wherein the configuration file is configured to reopen the predetermined interface for display of the sorting result at a later time.

2. The method according to claim 1, wherein the terminal computing device has a mechanical lever configured to be toggled at least between a first position and a second position, and the method further comprises:
   continuously monitoring the plurality of target objects being added to or updated by the terminal computing device in response to the mechanical lever being at the first position; and
   stopping monitoring the plurality of target objects added to or updated by the terminal computing device in response to the mechanical lever being at the second position.

3. The method according to claim 1, wherein the plurality of target objects further comprise objects added to or updated by the terminal computing device during a specified period of time or within a specified number of objects.

4. The method according to claim 1, wherein the plurality of target objects comprise at least one subset of a picture, a video, an audio, or a document.

5. The method according to claim 1, further comprising:
   displaying a link corresponding to one of the plurality of target objects on the predetermined interface, the link being configured to link to the one of the plurality of target objects.

6. The method according to claim 1, wherein the method further comprises:
   detecting target folders in response to the first instruction; and
   acquiring the plurality of target objects in target folders and respective attribute information of the plurality of target objects.

7. The method according to claim 1, further comprising:
   displaying in the predetermined interface, according to a user operation, a target object specified by the user that is not currently displayed in the predetermined interface; or, deleting, according to a user operation, a target object in the predetermined interface; or
   adjusting, according to a user operation, a display order of the at least one subset of the plurality of target objects or the subsidiary information of the plurality of target objects in the predetermined interface.

8. The method according to claim 7, further comprising:
updating the sorting result according to the user operation.

9. The method according to claim 1, wherein the predetermined interface is displayed on a top layer of a display interface of the terminal computing device, and the predetermined interface is capable of being moved and hidden according to user instructions.

10. The method according to claim 1, further comprising:
in response to determining that one or more of the target objects among the plurality of target objects are audio files, generating text corresponding to the audio files based on the audio files; and
displaying at least a part of the text in the predetermined interface.

11. A computing device, comprising:
at least one processor; and
at least one memory communicatively coupled to the at least one processor and storing instructions that upon execution by the at least one processor cause the device to implement operations comprising:
continuously monitoring a plurality of target objects added to or updated by the computing device associated with a user in response to a first instruction, wherein the plurality of target objects are contents created or updated by the user utilizing a plurality of target applications;
acquiring configuration information of the plurality of target applications;
determining a plurality of file saving paths corresponding to the plurality of target objects based on the configuration information of the plurality of target application;
acquiring the plurality of target objects based on the plurality of file saving paths;
sorting, by the computing device in real time, the plurality of target objects based on types and creation times corresponding to the plurality of target objects to obtain a sorting result;
displaying, in a predetermined interface of the computing device configured to display contents generated by different target applications on the same interface, representatives of at least one subset of the plurality of target objects based on the sorting result, wherein the at least one subset of the plurality of target objects are generated by different target applications among the plurality of application;
generating, by the computing device, a multimedia document based on the at least one subset of the plurality of target objects; and
generating, by the computing device, a configuration file corresponding to the predetermined interface in response to stopping monitoring the plurality of target object, wherein the configuration file is configured to reopen the predetermined interface for display of the sorting result at a later time.

12. A non-transitory computer-readable storage medium, storing program instructions that upon execution by a computing device, cause the computing device to perform operations comprising:
continuously monitoring a plurality of target objects added to or updated by the computing device associated with a user in response to a first instruction, wherein the plurality of target objects are contents created or updated by the user utilizing a plurality of target applications;
acquiring configuration information of the plurality of target applications;
determining a plurality of file saving paths corresponding to the plurality of target objects based on the configuration information of the plurality of target application;
acquiring the plurality of target objects based on the plurality of file saving paths;
sorting, by the computing device in real time, the plurality of target objects based on types and creation times corresponding to the plurality of target objects to obtain a sorting result;
displaying, in a predetermined interface of the computing device configured to display contents generated by different target applications on the same interface, representatives of at least one subset of the plurality of target objects based on the sorting result, wherein the at least one subset of the plurality of target objects are generated by different target applications among the plurality of application;
generating, by the computing device, a multimedia document based on the at least one subset of the plurality of target objects; and
generating, by the computing device, a configuration file corresponding to the predetermined interface in response to stopping monitoring the plurality of target object, wherein the configuration file is configured to reopen the predetermined interface for display of the sorting result at a later time.

13. The method according to claim 6, wherein the attribute information comprises at least one subset of object creation time, object update time, object name, object source, or object type.

14. The computing device according to claim 11, wherein the computing device has a mechanical lever configured to be toggled at least between a first position and a second position, and wherein the operations further comprise:
continuously monitoring the plurality of target objects being added to or updated by the computing device in response to the mechanical lever being at the first position; and
stopping monitoring the plurality of target objects added to or updated by the computing device in response to the mechanical lever being at the second position.

15. The computing device according to claim 11, wherein the plurality of target objects further comprise objects added to or updated by the computing device during a specified period of time or within a specified number of objects.

16. The computing device according to claim 11, the operations further comprising:
detecting target folders in response to the first instruction; and
acquiring the plurality of target objects in target folders and respective attribute information of the plurality of target objects.

17. The computing device according to claim 11, wherein the predetermined interface is displayed on a top layer of a display interface of the computing device, and wherein the predetermined interface is configured to be movable and hidden in response to user instructions.

18. The non-transitory computer-readable storage medium according to claim 12, wherein the computing device has a mechanical lever configured to be toggled at least between a first position and a second position, and wherein the operations further comprise:
continuously monitoring the plurality of target objects being added to or updated by the computing device in response to the mechanical lever being at the first position; and
stopping monitoring the plurality of target objects added to or updated by the computing device in response to the mechanical lever being at the second position.

19. The non-transitory computer-readable storage medium according to claim 12, the operations further comprising:
  detecting target folders in response to the first instruction; and
  acquiring the plurality of target objects in target folders and respective attribute information of the plurality of target objects.

20. The non-transitory computer-readable storage medium according to claim 12, wherein the predetermined interface is displayed on a top layer of a display interface of the computing device, and wherein the predetermined interface is configured to be movable and hidden in response to user instructions.

* * * * *